(12) United States Patent
Ito et al.

(10) Patent No.: US 7,297,403 B2
(45) Date of Patent: *Nov. 20, 2007

(54) DIELECTRIC CERAMIC COMPOSITION AND ELECTRONIC DEVICE

(75) Inventors: Kazushige Ito, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 11/247,179

(22) Filed: Oct. 12, 2005

(65) Prior Publication Data
US 2006/0088709 A1    Apr. 27, 2006

(30) Foreign Application Priority Data
Oct. 12, 2004    (JP) .............................. 2004-297874

(51) Int. Cl.
*B32B 5/66*    (2006.01)
(52) U.S. Cl. ...................... 428/402; 428/403; 428/404; 428/405; 428/406
(58) Field of Classification Search ................ 428/402, 428/403, 404, 405, 406
See application file for complete search history.

(56) References Cited

U.S. PATENT DOCUMENTS

2001/0021095 A1    9/2001    Mizuno et al.

2003/0218856 A1    11/2003    Chazono et al.

FOREIGN PATENT DOCUMENTS

| DE | 199 45 014 C1 | | 3/2001 |
|---|---|---|---|
| EP | 0877399 A2 | * | 11/1998 |
| EP | 1 128 404 A2 | | 8/2001 |
| JP | A 10-308321 | | 11/1998 |
| JP | 2000154057 | * | 6/2000 |
| JP | A 2001-313225 | | 11/2001 |
| JP | A-2003-048774 | | 2/2003 |
| JP | A 2004-111951 | | 4/2004 |

* cited by examiner

*Primary Examiner*—Leszek Kiliman
(74) *Attorney, Agent, or Firm*—Oliff & Berridge, PLC (57) ABSTRACT

A multilayer ceramic capacitor comprising a capacitor element body: wherein dielectric layers composed of a dielectric ceramic composition and internal electrode layers are alternately stacked; the dielectric ceramic composition comprises a plurality of dielectric particles each having a shell, wherein subcomponents are dispersed in a main component, formed around a core substantially composed of the main component; and a difference of the maximum thickness and the minimum thickness of the shell in the dielectric particles having an average particle diameter is controlled to be 6 to 60% of a radius of the dielectric particles; wherein a high permittivity and preferable temperature characteristic are obtained and TC bias characteristics are improved, is provided.

12 Claims, 7 Drawing Sheets

EXPOSED

DIELECTRIC CERAMIC COMPOSITION AND ELECTRONIC DEVICE

BACKGROUND OF THE INVENTION

1. Field of the Invention

The present invention relates to a dielectric ceramic composition, for example, used as a dielectric layer of a multilayer ceramic capacitor; and an electronic device, such as a multilayer ceramic capacitor using the dielectric ceramic composition as a dielectric layer.

2. Description of the Related Art

In the related art, it has been considered to be effective to secure a high permittivity and a preferable temperature characteristic that a dielectric layer of a multilayer ceramic capacitor as an example of electronic devices is formed by dielectric particles (crystal grains) having a core-shell structure, wherein a shell as a region of barium titanate as a main component dispersed with a subcomponent exists on a surface of a core substantially made by barium titanate not dispersed with any subcomponent. A variety of proposals have been made on a technique of giving the core-shell structure to crystal grains.

For example, the patent article 1 (the Japanese Unexamined Patent Publication No. 10-308321) discloses a technique of adding Mg as a subcomponent to barium titanate as a main component and adjusting a firing temperature and firing time, etc. to control a depth of Mg dispersing from crystal grain surfaces to its inside (that is, a shell thickness).

However, in the technique in the patent article 1, particle diameters of the dielectric particles composing a dielectric layer were approximately uniform and the shell thicknesses in the dielectric particles were also uniform, so that the temperature characteristic of the capacitance was preferable but the permittivity was liable to be small.

Thus, to overcome the disadvantage, the patent article 2 (the Japanese Unexamined Patent Publication No. 2004-111951) discloses a technique of making the shell thickness different in accordance with a particle diameter of the dielectric particles. Also, the patent article 2 describes that not all of the dielectric particles have to be covered with the shell and a dielectric particle with its core partially exposed to be open may be included.

The patent article 3 (the Japanese Unexamined Patent Publication No. 2001-313225) also discloses the technique of including dielectric particles with partially open cores. According to the patent article 3, by including the dielectric particles having partially open cores, a volume of the entire shell can be reduced and a permittivity of the entire ceramic sintered body can become high comparing with that in dielectric particles with cores covered entirely with the shell. As a result, a thickness of the dielectric layer can be as thick as possible without reducing the capacitance, so that it gives effects of responding to two opposing demands at a time: a demand for obtaining a thin layer with a large capacity and a demand for attaining reliability and a long lifetime.

When including the dielectric particles with partially exposed cores as disclosed in the patent articles 2 and 3, however, the TC bias characteristic deteriorates in some cases. The reason is not always clear, but it is considered because a voltage is applied to the core as a ferroelectric. When the TC bias characteristic deteriorates, there arises a disadvantage that the capacitance declines in an actual use and the product value is remarkably reduced.

SUMMARY OF THE INVENTION

An object of the present invention is to provide a dielectric ceramic composition, wherein a high permittivity and a preferable temperature characteristic are obtained and the TC bias characteristic is improved, used, for example, as a dielectric layer of a multilayer ceramic capacitor; and an electronic device, such as a multilayer ceramic capacitor using the dielectric ceramic composition as the dielectric layer.

The present inventors have been committed themselves to study on the core-shell structure of dielectric particles (crystal grains), found that the TC bias characteristic could be improved while securing a high permittivity and preferable temperature characteristic by using a dielectric particle, wherein the core was entirely covered with a shell but a thickness of the shell was uneven, instead of a dielectric particle, wherein a thickness of the shell was uneven and the shell was partially missing, so that a part of the core was exposed, and completed the present invention.

Namely, according to the present invention, there is provided a dielectric ceramic composition comprising a plurality of dielectric particles each having a shell, wherein subcomponents are dispersed in a main component, formed around a core substantially composed of the main component, wherein a difference of a maximum thickness t1 and a minimum thickness t2 (t1−t2) of said shell in a dielectric particle having an average particle diameter is controlled to be 6 to 60% of a radius R of said dielectric particle.

Preferably, the main component includes barium titanate.

Preferably, said subcomponents include an oxide of Mg, an oxide of rare-earth element and an oxide of an alkaline earth element (note that Mg is excluded).

Preferably, said subcomponents include
at least one kind selected from MgO, CaO, BaO and SrO as a first subcomponent,
silicon oxide as a second subcomponent,
at least one kind selected form $V_2O_5$, $MoO_3$ and $WO_3$ as a third subcomponent,
an oxide of R1 (note that R1 is at least one kind selected from Sc, Er, Tm, Yb and Lu) as a fourth subcomponent,
$CaZrO_3$ or $CaO+ZrO_2$ as a fifth subcomponent,
an oxide of R2 (note that R2 is at least one kind selected from Y, Dy, Ho, Tb, Gd and Eu) as a sixth subcomponent, and
MnO as a seventh subcomponent;
and ratios of the respective subcomponents with respect to 100 moles of said main component are
the first subcomponent: 0.1 to 3 moles,
the second subcomponent: 2 to 10 moles,
the third subcomponent: 0.01 to 0.5 mole,
the fourth subcomponent: 0.5 to 7 moles (note that the number of moles of the fourth subcomponent is a ratio of R1 alone),
the fifth subcomponent: 0<fifth subcomponent≦5 moles,
the sixth subcomponent: 9 moles or less (note that the number of moles of the sixth subcomponent is a ratio of R2 alone), and
the seventh subcomponent: 0.5 mole or less.

Preferably, said subcomponents include
an oxide of AE (note that AE is at least one kind selected from Mg, Ca, Ba and Sr) as a first subcomponent,
an oxide of R (note that R is at least one kind selected from Y, Dy, Tm, Ho and Er) as a second subcomponent,
$MxSiO_3$ (note that M is at least one kind selected from Ba, Ca, Sr, Li and B; and x=1 when M=Ba, x=1 when M=Ca, X=1 when M=Sr, x=2 when M=Li and x=2/3 when M=B) as a third subcomponent, MnO as a fourth subcomponent, at least one kind selected form $V_2O_5$, $MoO_3$ and $WO_3$ as a fifth subcomponent, and $CaZrO_3$ or $CaO+ZrO_2$ as a sixth subcomponent;

and ratios of the respective subcomponents with respect to 100 moles of said main component are the first subcomponent: 0 to 0.1 mole (note that 0 mole and 0.1 mole are excluded), the second subcomponent: 1 to 7 moles (note that 1 mole and 7 moles are excluded), the third subcomponent: 2 to 10 moles, the fourth subcomponent: 0 to 0.5 mole (note that 0 mole is excluded), the fifth subcomponent: 0.01 to 0.5 mole, and the sixth subcomponent: 0 to 5 moles (note that 0 mole and 5 moles are excluded).

An electronic device according to the present invention is not particularly limited as far as it comprises a dielectric layer and is, for example, a multilayer ceramic capacitor element comprising a capacitor element body, wherein dielectric layers and internal electrode layers are alternately stacked. In the present invention, the dielectric layer is composed of the dielectric ceramic composition as set forth in any one of the above. The conductive material included in the internal electrode layer is not particularly limited and is, for example, Ni or a Ni alloy.

According to the present invention, since the dielectric particles have the core-shell structure that a shell, wherein subcomponents are dispersed in barium titanate, is provided around the core substantially composed of barium titanate as a main component, so that it is possible to provide a dielectric ceramic composition, wherein a high permittivity and a preferable temperature characteristic are obtained and the TC bias characteristic is improved, used, for example, as a dielectric layer, etc. of a multilayer ceramic capacitor; and an electronic device, such as a multilayer ceramic capacitor using the dielectric ceramic composition as the dielectric layer.

The electronic device according to the present invention is not particularly limited and a multilayer ceramic capacitor, piezoelectric element, chip inductor, chip varistor, chip thermister, chip resistance and other surface mounted (SMD) chip type electronic device, etc. may be mentioned.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

In the present embodiment, a multilayer ceramic capacitor 1 shown in FIG. 1 will be explained as an example of an electronic device.

Multilayer Ceramic Capacitor

Figure 1:
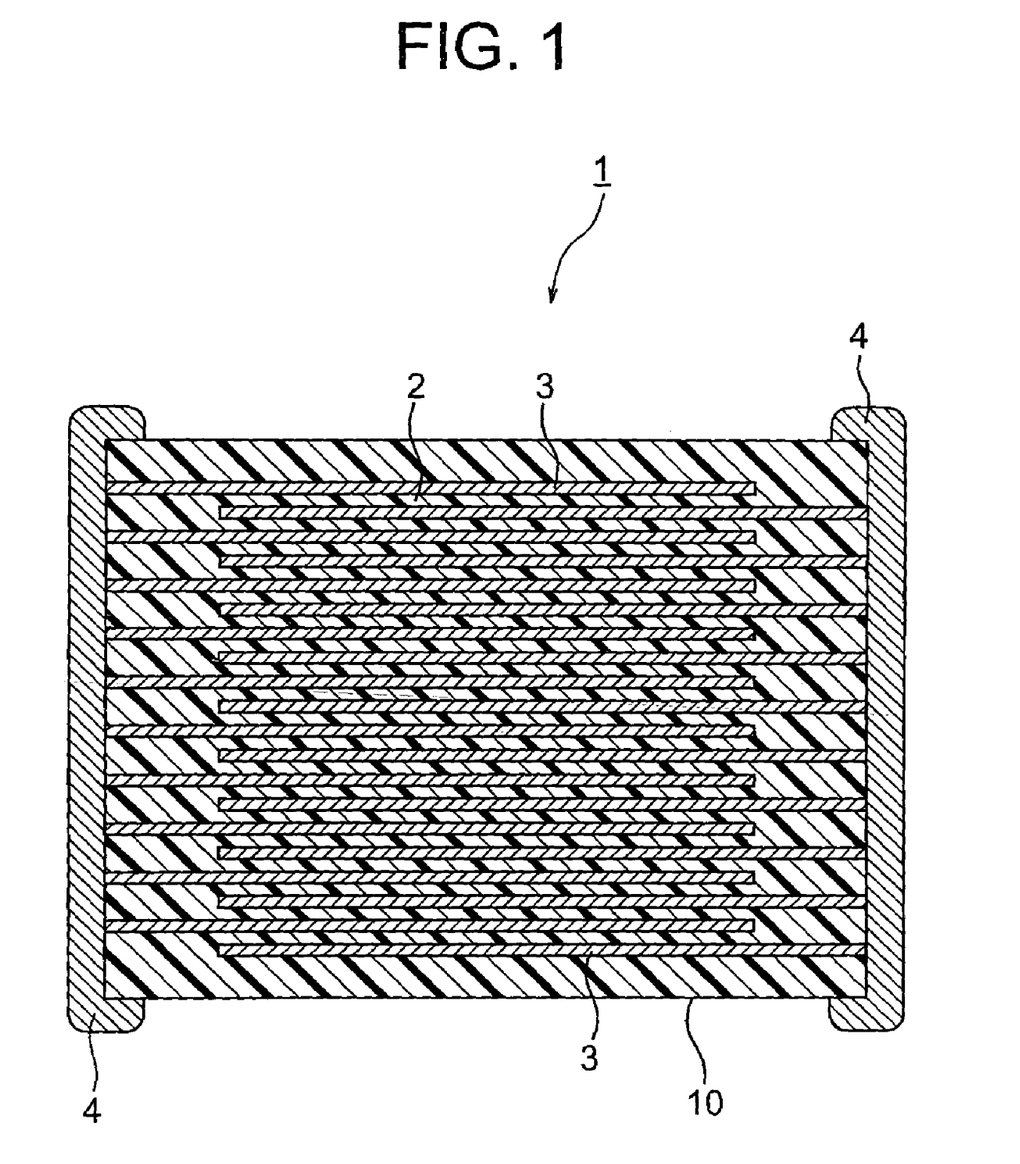
FIG. 1 is a schematic sectional view of a multilayer ceramic capacitor according to an embodiment of the present invention.

As shown in FIG. 1, the multilayer ceramic capacitor 1 as an electronic device according to an embodiment of the present invention comprises a capacitor element body 10, wherein dielectric layers 2 and internal electrode layers 3 are alternately stacked. On both end portions of the capacitor element body 10, a pair of external electrodes 4 are formed to be connected respectively to the internal electrode layers 3 alternately arranged inside the element body 10. The internal electrode layers 3 are stacked, so that each of the end surfaces is alternately exposed to surfaces of the two facing end portions of the capacitor element body 10. The pair of external electrodes 4 are formed on both end portions of the capacitor element body 10 and connected to the exposed end surfaces of the alternately arranged internal electrode layers 3 so as to compose a capacitor circuit.

An outer shape and size of the capacitor element body 10 are not particularly limited and may be suitably determined in accordance with the use object and, normally, the outer shape may be approximate rectangular parallelepiped and the size may be a length (0.4 to 5.6 mm)×a width (0.2 to 5.0 mm)×a height (0.2 to 1.9 mm) or so.

Dielectric Layer

A composition of the dielectric layer 2 is not particularly limited in the present invention and may be, for example, composed of a dielectric ceramic composition below.

The dielectric ceramic composition of the present embodiment includes barium titanate (preferably, expressed by a composition formula of $(BaO)_m \cdot TiO_2$, wherein the mole ratio "m" is 0.990 to 1.035) as a main component.

The dielectric ceramic composition of the present embodiment includes a subcomponent in addition to the main component. As the subcomponent, those including an oxide of Mg, oxide of rare earth elements and oxide of alkaline earth metal elements (note that Mg is excluded) may be mentioned. By adding the subcomponent, a property as a capacitor can be obtained even when fired in a reducing atmosphere. Note that trace components, such as C, F, Li, Na, K, P, S, Cl, may be included by about 0.1 wt % or less as impurities. Note that the composition of the dielectric layer 2 is not limited to the above in the present invention.

In the present embodiment, it is preferable to use those having the composition below as the dielectric layer 2.

The composition includes barium titanate expressed by a composition formula $(BaO)_m \cdot TiO_2$, wherein the mole ratio "m" is 0.990 to 1.035, as a main component;

at least one kind selected from MgO, CaO, BaO and SrO as a first subcomponent, silicon oxide as a second subcomponent, at least one kind selected from $V_2O_5$, $MoO_3$ and $WO_3$ as a third subcomponent, an oxide of R1 (note that R1 is at least one kind selected from Sc, Er, Tm, Yb and Lu) as a fourth subcomponent, $CaZrO_3$ or $CaO+ZrO_2$ as a fifth subcomponent, an oxide of R2 (note that R2 is at least one kind selected from Y, Dy, Ho, Tb, Gd and Eu) as a sixth subcomponent, and MnO as a seventh subcomponent. When calculating barium titanate in terms of $[(BaO)_{0.990\ to\ 1.035} \cdot TiO_2]$, ratios with respect to 100 moles of $[(BaO)_{0.990\ to\ 1.035} \cdot TiO_2]$ are the first subcomponent: 0.1 to 3 moles, the second subcomponent: 2 to 10 moles, the third subcomponent: 0.01 to 0.5 mole, the fourth subcomponent: 0.5 to 7 moles (note that the number of moles of the fourth subcomponent is a ratio of R1 alone), the fifth subcomponent: 0 <fifth subcomponent≦5 moles, the sixth subcomponent: 9 moles or less (note that the number of moles of the sixth subcomponent is a ratio of R2 alone), and the seventh subcomponent: 0.5 mole or less.

Alternately, another composition includes barium titanate expressed by a composition formula $(BaO)_m \cdot TiO_2$, wherein the mole ratio "m" is 0.990 to 1.035, as a main component;

an oxide of AE (note that AE is at least one kind selected from Mg, Ca, Ba and Sr) as a first subcomponent, an oxide of R (note that R is at least one kind selected from Y, Dy, Tm, Ho and Er) as a second subcomponent, $MxSiO_3$ (note that M is at least one kind selected from Ba, Ca, Sr, Li and B; and x=1 when M=Ba, x=1 when M=Ca, X=1 when M=Sr, x=2 when M=Li and x=2/3 when M=B) as a third subcomponent, MnO as a fourth subcomponent, at least one kind selected from $V_2O_5$, $MoO_3$ and $WO_3$ as a fifth subcomponent, and $CaZrO_3$ or $CaO+ZrO_2$ as a sixth subcomponent. When calculating barium titanate in terms of $[(BaO)_{0.990\ to\ 1.035} \cdot TiO_2]$, ratios with respect to 100 moles of $[(BaO)_{0.990\ to\ 1.035} \cdot TiO_2]$ are the first subcomponent: 0 to 0.1 mole (note that 0 mole and 0.1 mole are excluded), the second subcomponent: 1 to 7 moles (note that 1 mole and 7 moles are excluded), the third subcomponent: 2 to 10 moles, the fourth subcomponent: 0 to 0.5 mole (note that 0 mole is excluded), the fifth subcomponent: 0.01 to 0.5 mole, and the sixth subcomponent: 0 to 5 moles (note that 0 mole and 5 moles are excluded).

By attaining the above compositions, a temperature characteristic of the capacitance of the X8R characteristics (−55 to 150° C. and ΔC/C=within ±15%) of the EIAJ standard can be satisfied.

Figure 2:
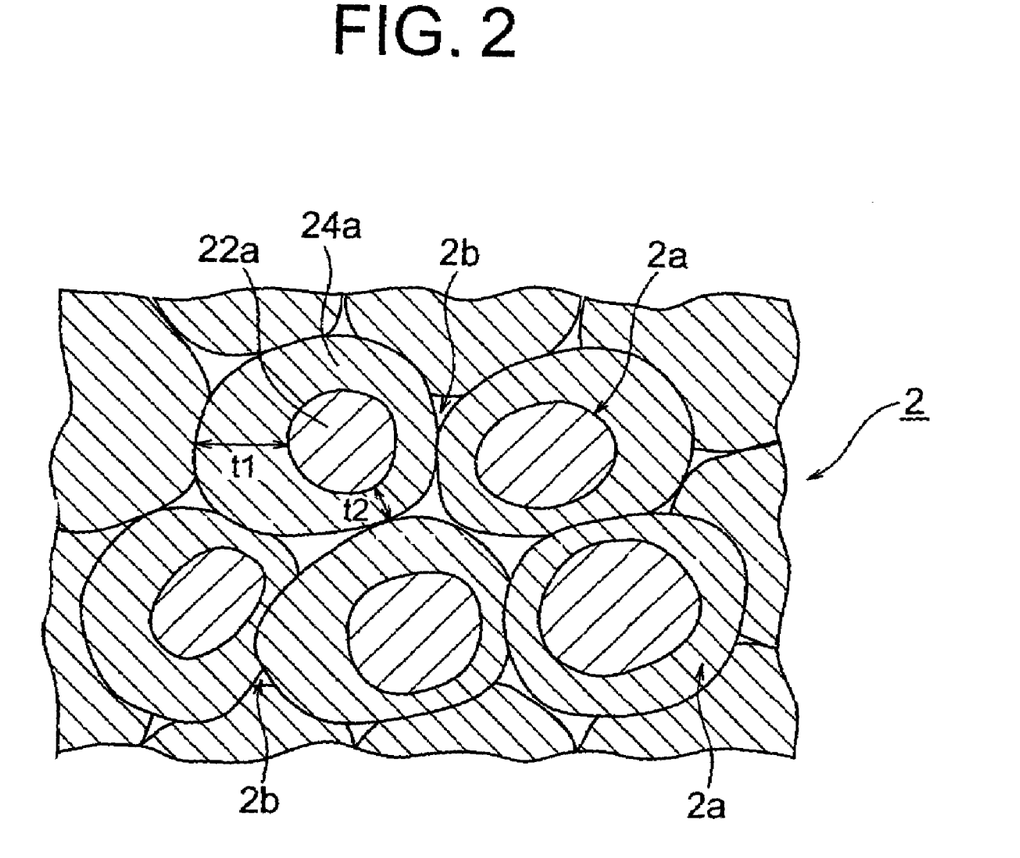
FIG. 2 is an enlarged sectional view of a key part of a dielectric layer 2 shown in FIG. 1.

The number of layers, thickness and other condition of the dielectric layer 2 may be suitably determined in accordance with the object and use, and the thickness of the dielectric layer 2 in the present embodiment is made preferably as thin as 7.5 μm or thinner and more preferably 4 μm or thinner. In the present embodiment, even when the thickness of the dielectric layer 2 is made thin as such, a variety of electric characteristics, particularly, a sufficient permittivity and improved TC bias characteristic can be obtained.

Fine Structure of Dielectric Layer

As shown in FIG. 2, the dielectric layer 2 is configured to include a plurality of dielectric particles (crystal grains) 2a and grain boundary phases 2b formed between a plurality of adjacent dielectric particles 2a.

The dielectric particles (crystal grains) 2a have the core-shell structure that a shell (subcomponent dispersion layer) 24a, wherein a subcomponent is dispersed in barium titanate, is provided around a core 22a substantially composed of barium titanate as the main component.

The core-shell structure of the dielectric particles 2a indicates the structure that the core 22a as the center part of the dielectric particle and the shell 24a for covering the core 22a surface form physically and chemically different phases. It is considered that subcomponent elements are practically dispersed more on the particle surface side comparing with that at the center of the dielectric particle 2a and form the shell 24a.

In the case of a dielectric particle 2a having an average particle diameter value, a difference of the maximum thickness t1 and the minimum thickness t2 (t1−t2) of the shell 24a is controlled to be 6 to 60%, preferably, 10 to 40% of a radius (corresponding to half the value of the average particle diameter) R of the dielectric particle 2a. By forming the shell 24a in such a range, it is possible to improve the TC bias characteristic while maintaining a high permittivity and preferable temperature characteristic.

Namely, in the present embodiment, a thickness of the shell 24a of the dielectric particle 2a is not uniform and the dielectric particle 2a is not the one with a partially missing shell and partially exposed core 22a. Note that such particles may be included as far as it is in a small amount of not hindering the object of the present invention.

The maximum thickness t1 of the shell 24a is normally 0.01 to 0.1 μm and preferably 0.03 to 0.05 μm, and the minimum thickness t2 is normally 0.001 to 0.009 μm and preferably 0.003 to 0.007 μm.

Note that an average particle diameter D50 (unit: μm) of the entire dielectric particles 2a is a value obtained by cutting the capacitor element body 10 in the stacking direction of the dielectric layers 2 and the internal electrode layers 3, measuring an average area of at least 200 of the dielectric particles 2a on the section shown in FIG. 2, calculating the diameter by an equivalent circle diameter and multiplying the result with 1.5. In the present embodiment, the average particle diameter D50 of the entire dielectric particles 2a may be equal to the thickness of the dielectric layer 2 at maximum, and is preferably 25% of the thickness of the dielectric layer 2 or smaller, and more preferably 15% or smaller.

A method of controlling the above (t1−t2) value is not particularly limited and an example thereof will be explained later on.

Components of the grain boundary phase 2b are normally oxides of materials composing the dielectric material or internal electrode material, oxides of separately added materials and, furthermore, oxides of materials to be mixed in as impurities in the procedure.

Internal Electrode Layer

Figure 3:
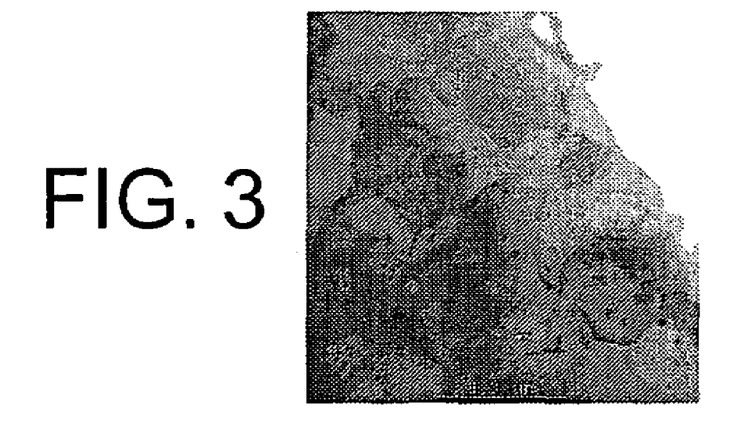
FIG. 3 is a picture of a fine structure of crystal grains corresponding to an example (sample 4) having an uneven shell thickness of the present invention observed with a TEM.

The internal electrode layers 3 shown in FIG. 3 are formed by a base metal conductive material substantially serving as an electrode. As the base metal to be used as the conductive material, Ni or a Ni alloy is preferable. As the Ni alloy, an alloy of one or more kinds selected from Mn, Cr, Co, Al, Ru, Rh, Ta, Re, Os, Ir, Pt and W, etc. with Ni is preferable, and a content of Ni in the alloy is preferably 95 wt % or more. Note that the Ni or the Ni alloy may contain various trace components, such as P, C, Nb, Fe, Cl, B, Li, Na, K, F and S, etc. by not more than 0.1 wt % or so. A thickness of the internal electrode layer 3 in the present embodiment is made as thin as preferably 2 μm or thinner, and more preferably 1.5 μm or thinner.

External Electrode

As the external electrodes 4 shown in FIG. 1, at least one kind of Ni, Pd, Ag, Au, Cu, Pt, Rh, Ru and Ir, etc. or an alloy of these may be normally used. Normally, Cu, a Cu alloy, Ni, a Ni alloy, etc., Ag, an Ag—Pd alloy and In—Ga alloy, etc. are used. A thickness of the external electrode 4 may be suitably determined in accordance with the use object and it is normally preferable to be 10 to 200 μm or so.

Production Method of Multilayer Ceramic Capacitor

Next, an example of a method of producing the multilayer ceramic capacitor 1 according to the present embodiment will be explained.

(1) In the present embodiment, a dielectric layer paste for composing a pre-fired dielectric layer for forming the dielectric layer 2 shown in FIG. 1 after firing and an internal electrode layer paste for composing a pre-fired internal electrode layer for forming the internal electrode layer 3 shown in FIG. 1 after firing are prepared. Also, an external electrode paste is also prepared.

The dielectric layer paste is fabricated by kneading a dielectric material and an organic vehicle.

(1-1) The dielectric material used in the present embodiment includes respective materials for composing the dielectric ceramic composition explained above at predetermined composition ratios. For this purpose, a barium titanate material as the main component material and respective subcomponent materials are prepared.

An adding quantity of each material is determined to give the composition of the dielectric ceramic composition explained above after firing.

(1-2) According to the first aspect, a part of the subcomponent materials is added to the barium titanate material and first preliminary firing is performed, so that a thin shell is formed on surfaces of barium titanate material particles.

An amount (adding quantity) of the subcomponent material to be added at the first preliminary firing is one factor for controlling the difference of the maximum thickness t1 and the minimum thickness t2 (t1−t2) of the shell 24a explained above. The amount (adding quantity) of the subcomponent material to be added at the first preliminary firing is preferably 40% of the final adding quantity or smaller (note that 0% is not included), and more preferably 10 to 30%. When the subcomponent adding quantity at the first preliminary firing is too much, the shell thickness becomes uniform and the permittivity declines, while when too small, the core is exposed and the TC bias declines.

Specifically, in an example that final adding quantities with respect to 100 moles of $BaTiO_3$ are 0.9 mole of MgO, 0.37 mole of MnO, 0.1 mole of $V_2O_5$, 4.5 moles of $(Ba_{0.6}Ca_{0.4})SiO_3$, 3 moles of $Y_2O_3$, 1.75 moles of $Yb_2O_3$ and 1.5 moles of $CaZrO_3$, and when adding 30% of these final adding quantities, subcomponent materials to be added at the first preliminary firing are 0.27 mole of MgO, 0.111 mole of MnO, 0.03 mole of $V_2O_5$, 1.35 moles of $(Ba_{0.6}Ca_{0.4})SiO_3$, 0.9 mole of $Y_2O_3$, 0.525 mole of $Yb_2O_3$ and 0.45 mole of $CaZrO_3$.

A holding temperature at the first preliminary firing is also a factor for controlling the difference of the maximum thickness t1 and the minimum thickness t2 (t1−t2) of the shell 24a explained above. The holding temperature at the first preliminary firing is preferably 600° C. or higher, and more preferably 700 to 900° C. When the preliminary firing temperature is low here, it is liable that a thin shell cannot be formed on surfaces of the barium titanate material particles.

The holding time of the holding temperature at the first preliminary firing is preferably 0.5 to 10 hours, and more preferably 1 to 4 hours. When the firing holding time here is too short, a thin shell cannot be formed on the surfaces of the barium titanate material particles, while when the firing holding time is too long, the shell thickness becomes uniform and the permittivity declines.

Other condition of the first preliminary firing is a temperature raising rate of 50 to 400° C./hour, particularly, 100 to 300° C., and an atmosphere of in the air or in nitrogen.

A thickness of the thin shell to be formed on the surfaces of the barium titanate material particles after the first preliminary firing is normally 0.001 to 0.009 μm, and preferably 0.003 to 0.007 μm or so.

Next, the rest of the subcomponent materials is added to the barium titanate material particles after the first preliminary firing and second preliminary firing at a low temperature is performed to form a preliminarily fired powder. The obtained preliminarily fired powder has an uneven shell thickness.

An amount (adding quantity) of each of the subcomponent materials to be added at the second preliminary firing is the rest of the finally adding quantity thereof. In the case of the above example, 0.63 mole of MgO, 0.259 mole of MnO, 0.07 mole of $V_2O_5$, 3.15 moles of $(Ba_{0.6}Ca_{0.4})SiO_3$, 2.1 moles of $Y_2O_3$, 1.225 moles of $Yb_2O_3$ and 1.05 moles of $CaZrO_3$ are added here.

A holding temperature at the second preliminary firing is also a factor for controlling the difference of the maximum thickness t1 and the minimum thickness t2 (t1−t2) of the shell 24a explained above. The holding temperature at the second preliminary firing is preferably 800° C. or lower, and more preferably 400 to 750° C. When the firing temperature is high here, the thickness of the finally formed shell 24a does not become uneven.

A holding time at the second preliminary firing is preferably 0.5 to 10 hours, and more preferably 1 to 4 hours. When the firing holding time here is too short, the cores are exposed and the TC bias declines. On the other hand, when the firing holding time is too long, the shell thickness become uniform and the permittivity declines.

Other condition of the second preliminary firing is a temperature raising rate of 50 to 400° C./hour, particularly, 100 to 300° C./hour and an atmosphere of in the air and in nitrogen.

(1-3) According to the second aspect, the first preliminary firing performed in the case of the first aspect explained above is not performed, and by coating the barium titanate material with a part of the subcomponent materials, a thin shell is formed on surfaces of the barium titanate material particles. Then, the second preliminary firing in the case of the first aspect is performed, so that a preliminarily fired powder is formed. The obtained preliminarily fired powder has an uneven shell thickness in the same way as in the case of the first aspect.

To coat a part of the subcomponent materials, a method of making the additives be in a liquid phase by using an organic metal, etc., mixing the same in the barium titanate as the main component and, then, performing preliminary firing is used.

(1-4) Next, after roughly pulverizing the obtained preliminarily fired powder with an alumina roll, etc., it is mixed with pure water or other dispersion medium by a ball mill, etc. in accordance with need and dried, so that a dielectric material is obtained.

Note that, as the dielectric material composed of the above components, the above oxides, mixtures thereof, and composite oxides may be used. Other than that, it is possible to suitably select from a variety of compounds, such as carbonates, oxalates, nitrites, hydroxides and organic metal compounds, which become the above oxides, mixtures thereof or composite oxides, and mix to use.

A content of each compound in the dielectric material may be determined to give the composition of the dielectric ceramic composition explained above after firing.

An average particle diameter of the dielectric material is preferably 5 μm or smaller, and more preferably 0.1 to 1 μm or so in a state of being yet to be a paste.

An organic vehicle includes a binder and a solvent. As the binder, a variety of normal binders, such as ethyl cellulose, polyvinyl butyral and an acrylic resin, may be used. The solvent is not particularly limited and an organic solvent, such as terpineol, butyl carbitol, acetone, toluene, xylene and ethanol, may be used.

The dielectric layer paste may be formed by kneading the dielectric material and a vehicle obtained by dissolving a water-soluble binder in water. The water-soluble binder is not particularly limited and polyvinyl alcohol, methyl cellulose, hydroxyethyl cellulose, a water-soluble acrylic resin and emulsion, etc. may be used.

An internal electrode layer paste is fabricated by kneading the conductive material composed of the above variety of conductive metals and alloys, or a variety of oxides, organic metal compounds and resonates, etc. to be the above conductive materials after firing with the above organic vehicle.

An external electrode paste is fabricated also in the same way as that of the internal electrode layer paste.

A content of the organic vehicle in each paste is not particularly limited and may be a normal content of, for example, 1 to 5 wt % or so of the binder and 10 to 50 wt % or so of the solvent. Also, additives selected from a variety of dispersants, plasticizers, dielectrics and insulators, etc. may be included in each paste in accordance with need.

(2) Next, the dielectric layer paste including the dielectric material and the internal electrode layer paste are used to produce a green chip, wherein the pre-fired dielectric layers and the pre-fired internal electrode layers are stacked. The external electrode paste is printed or transferred to the capacitor element body 10 composed of a sintered body formed through a binder removal step, firing step and, if necessary, annealing step and fired to form the external electrodes 4, so that the multilayer ceramic capacitor 1 is produced.

Particularly, it is preferable to control firing time of the green chip suitably because it is a factor for controlling the difference of the maximum thickness t1 and the minimum thickness t2 (t1−t2) of the shell 24a explained above.

In the present embodiment, by holding the green chip at a firing holding temperature of preferably 1180 to 1320° C., and more preferably 1200 to 1300° C. for preferably 0.5 to 4 hours, and more preferably 1 to 2.5 hours, the value of (t1−t2) can be controlled to be in the suitable range explained above. When the firing holding time is short, the (t1−t2) value tends to become large (toward the direction that a part of the shell is missing and the core becomes open), while when long, the (t1−t2) value tends to become small (toward the direction that the shell thickness becomes uniform).

Other firing condition is a temperature raising rate of preferably 50 to 500° C./hour, and more preferably 100 to 300° C./hour. A temperature lowering rate is preferably 50 to 500° C./hour, and more preferably 200 to 300° C./hour. A firing atmosphere is preferably in a reducing atmosphere. As the atmosphere gas in a reducing atmosphere, it is preferable to use, for example, a wet mixed gas of $N_2$ and $H_2$. An oxygen partial pressure in the firing atmosphere is preferably $6 \times 10^{-8}$ to $10^{-4}$ Pa.

The multilayer ceramic capacitor 1 obtained in the present embodiment has dielectric layers 2 including dielectric particles 2a having the core-shell structure that the shell 24a, wherein a subcomponent is dispersed in barium titanate, is formed around the core 22a substantially composed of barium titanate as the main component as explained above, so that a high permittivity and a preferable temperature characteristic are obtained and, at the same time, the TC bias characteristic is improved and reliability is also improved.

An embodiment of the present invention was explained above, but the present invention is not limited to the embodiment and may be variously embodied within the scope of the present invention.

For example, in the above embodiment, a multilayer ceramic capacitor was explained as an example of an electronic device according to the present invention, but the electronic device according to the present invention is not limited to a multilayer ceramic capacitor and may be any as far as it includes a dielectric layer composed of a dielectric ceramic composition having the above composition.

EXAMPLES

Below, the present invention will be explained based on further detailed examples, but the present invention is not limited to the examples.

Example 1

Production of Dielectric Material

First, a barium titanate material and subcomponent materials were prepared. As the barium titanate material, $BaTiO_3$ (hereinafter, also referred to as BT) having an average particle diameter of 0.25 μm was used. As the subcomponent materials, MgO, MnO, $V_2O_5$, $(Ba_{0.6}Ca_{0.4})SiO_3$ (hereinafter, also referred to as BCG), $Y_2O_3$, $Yb_2O_3$ and $CaZrO_3$ having an average particle diameter of 0.01 to 0.1 μm were used. The BCG was produced by performing wet mixing on $BaCO_3$, $CaCO_3$ and $SiO_2$ by a ball mill for 16 hours, drying, then, firing at 1150° C. in the air and, furthermore, performing wet grinding by a ball mill for 100 hours. $CaZrO_3$ was produced by performing wet mixing on $CaCO_3$ and $ZrO_3$ by a ball mill for 16 hours, drying, then, firing at 1150° C. in the air and, furthermore, performing wet grinding by a ball mill for 24 hours.

Next, these materials were weighed, so that the composition after firing becomes 0.9 mole of MgO, 0.37 mole of MnO, 0.1 mole of $V_2O_5$, 4.5 moles of BCG, 3 moles of $Y_2O_3$, 1.75 moles of $Yb_2O_3$ and 1.5 moles of $CaZrO_3$ with respect to 100 moles of BT as a main component. These weighed amounts are the final adding quantities of the subcomponents.

Next, the subcomponents in amounts of 30% of the final adding quantities (0.27 mole of MgO, 0.111 mole of MnO, 0.03 mole of $V_2O_5$, 1.35 moles of BCG, 0.9 mole of $Y_2O_3$ and 0.525 mole of $Yb_2O_3$ and 0.45 mole of $CaZrO_3$) were added to 100 moles of BT, and wet mixing by a ball mill was performed for 16 hours by using water as the solvent, so that a first pre-fired powder was prepared.

Next, first preliminary firing was performed on the obtained first pre-fired powder at 700° C. in the air for three hours, so that first preliminarily fired powder was obtained. When observing the first preliminarily fired powder with an electron microscope, a thin shell (a thickness of 0.003 μm) was observed on surfaces of barium titanate material particles.

Next, the rest of the final adding quantities of the subcomponent materials (0.63 mole of MgO, 0.259 mole of MnO, 0.07 mole of $V_2O_5$ and 3.15 moles of BCG, 2.1 moles of $Y_2O_3$, 1.225 moles of $Yb_2O_3$ and 1.05 moles of $CaZrO_3$) were added to the first preliminarily fired powder, and wet mixing was performed for 16 hours by using water as the solvent, so that a second pre-fired powder was prepared.

Next, the obtained second pre-fired powder was subjected to preliminary second firing at the temperature shown in Table 1 for 3 hours in the air to obtain a second preliminarily fired powder. When observing the second preliminarily fired powder with a microscope, it was confirmed that a thickness of a shell formed on surfaces of the barium titanate material powders was uneven.

Next, the second preliminarily fired powder was pulverized with an alumina roll and a dielectric material having the final composition was obtained. The dielectric material included 0.9 mole of MgO, 0.37 mole of MnO, 0.1 mole of $V_2O_5$, 4.5 moles of BCG, 3 moles of $Y_2O_3$, 1.75 moles of $Yb_2O_3$ and 1.5 moles of $CaZrO_3$ with respect to 100 moles of BT.

Fabrication of Pastes

Next, the obtained dielectric material was added with a polyvinyl butyral resin and an ethanol based organic solvent, mixed again with a ball mill to be a paste, so that a dielectric layer paste was obtained.

Next, 44.6 parts by weight of Ni particles, 52 parts by weight of terpineol, 3 parts by weight of ethyl cellulose and 0.4 part by weight of benzotriazole were kneaded by a triple roll to be a slurry, so that an internal electrode paste was obtained.

Production of Sintered Body

By using the obtained dielectric layer paste, a green sheet was formed on a PET film by a doctor blade method. The internal electrode paste was printed thereon by a screen printing method. Then, the green sheet to be a cover is removed from the PET film, a plurality of green sheets were stacked to be a thickness of 300 μm or so, sheets printed with the internal electrode paste were removed from the PET film and stacked by the desired number (5 in this case), furthermore, a green sheet to be a cover was stacked again and bonded with a pressure, so that a green chip was obtained. Note that a thickness of the dielectric layer in a green state was 3.5 μm at this time.

Next, the green chip was cut to be a predetermined size and subjected to binder removal processing, firing and annealing on the conditions below so as to obtain a chip sintered body. The binder processing condition was a temperature raising rate of 60° C./hour, holding temperature of 260° C., temperature holding time of 8 hours and atmosphere of in the air. The firing condition was a temperature raising rate of 200° C./hour, holding temperature of 1240° C., temperature holding time of 2 hours, temperature cooling rate of 200° C./hour and atmosphere of a wet mixed gas of $N_2$ and $H_2$. The annealing condition was a temperature raising rate of 200° C./hour, holding temperature of 1000° C., temperature holding time of 2 hours, temperature cooling rate of 200° C./hour and atmosphere of a wet $N_2$ gas. Note that a wetter, wherein a water temperature was 20° C., was used to wet the atmosphere gas at firing and annealing.

A size of the obtained sintered body was 3.2 mm in the length×1.6 mm in the width×0.6 mm in the height, and the number of dielectric layers between internal electrode layers was 5.

Structure of Sintered Body (Dielectric Ceramic Composition)

After processing the obtained sintered body to give a thickness of 10 μm, the sample was made still thinner by ion milling. Then, a scanning transmission electron microscope (TEM) was used for observation and it was confirmed that the sample was composed of crystal grains 2a and grain boundary phases 2b.

Average Grain Diameter of Crystal Grains in Sintered Body

After polishing and etching the obtained sintered body, the polished surface was observed with a scanning electron microscope (SEM) and an average grain diameter of the crystal grains was measured based on the code method by assuming that the crystal grain 2a has a spherical shape. An average value of 250 measuring points was used as the average crystal grain diameter. The result was 0.32 μm.

Fine Structure of Crystal Grains Having Average Grain Diameter

Figure 4:
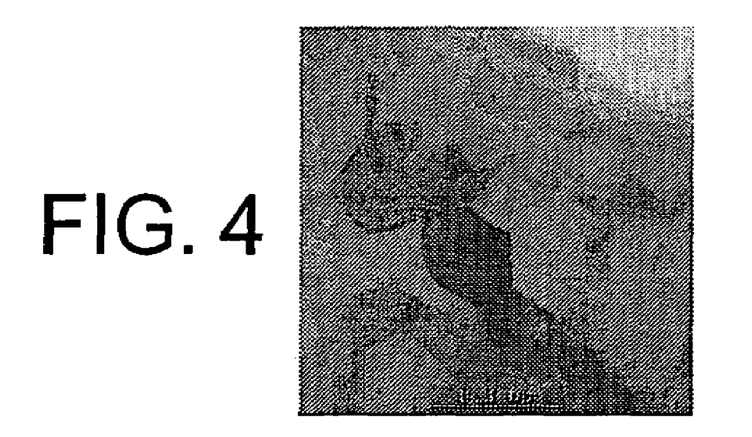
FIG. 4 is a picture of a fine structure of crystal grains corresponding to a comparative example (sample 9) of the present invention, wherein the shell is partially missing and the core is exposed, observed with a TEM.
Figure 5:
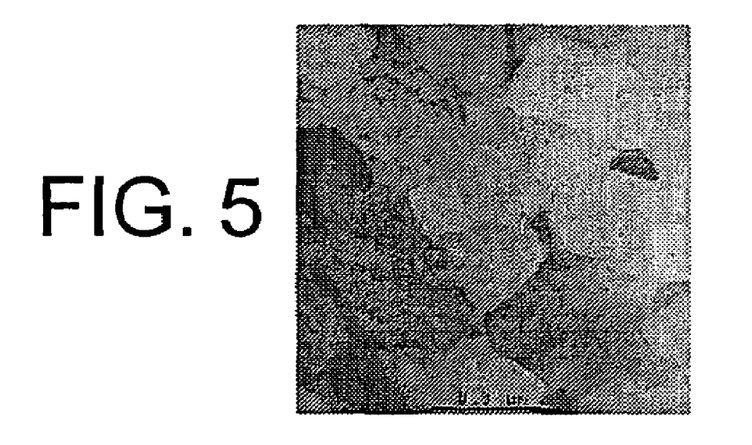
FIG. 5 is a picture of a fine structure of crystal grains corresponding to a comparative example (sample 8) having a uniform shell thickness of the present invention observed with a TEM.
Figure 6:
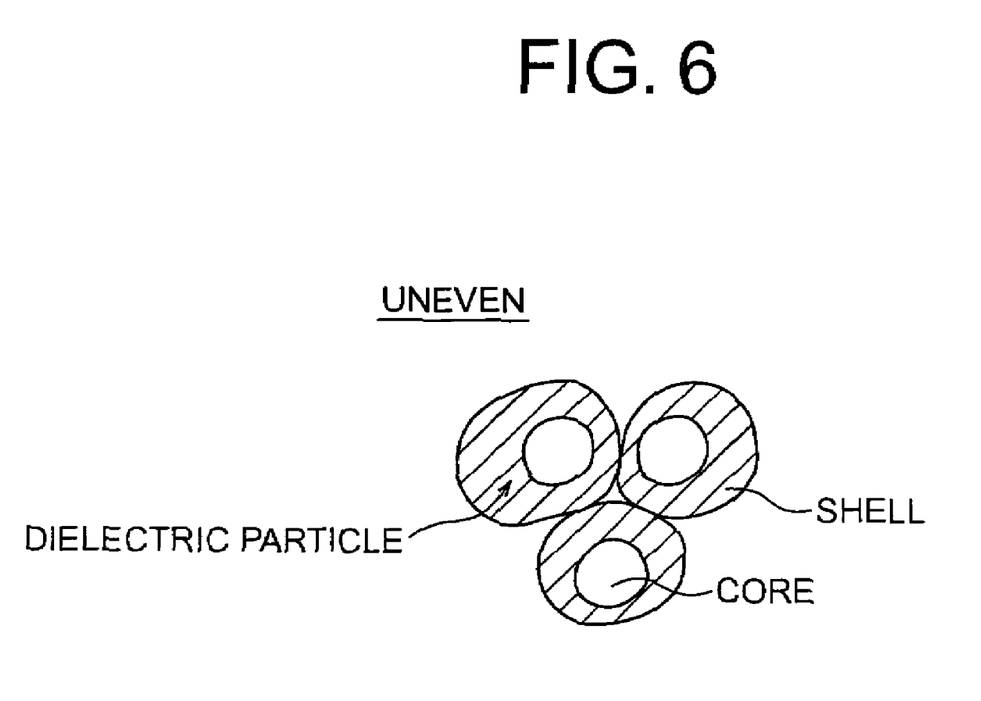
FIG. 6 is a schematic view of the TEM picture in FIG. 3.
Figure 7:
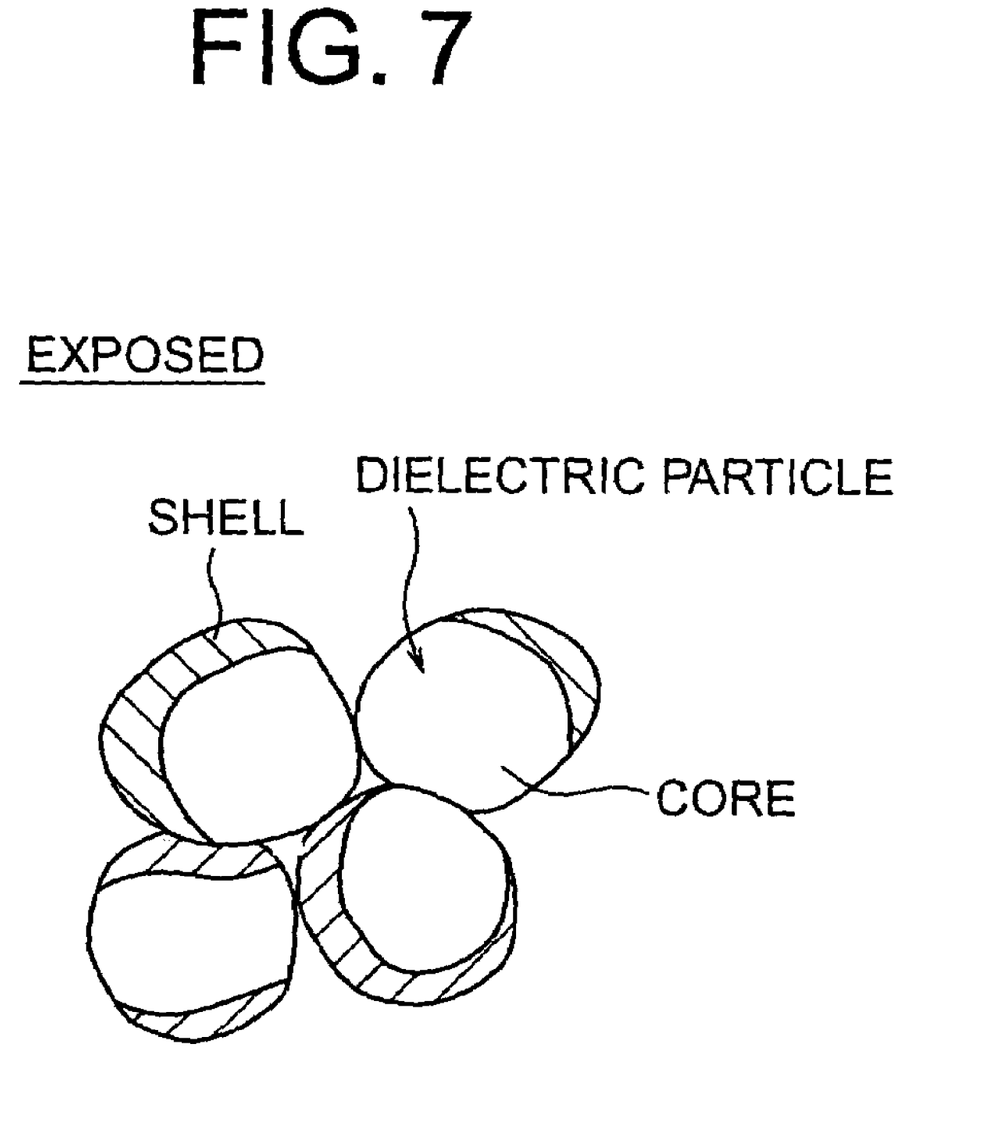
FIG. 7 is a schematic view of the TEM picture in FIG. 4.
Figure 8:
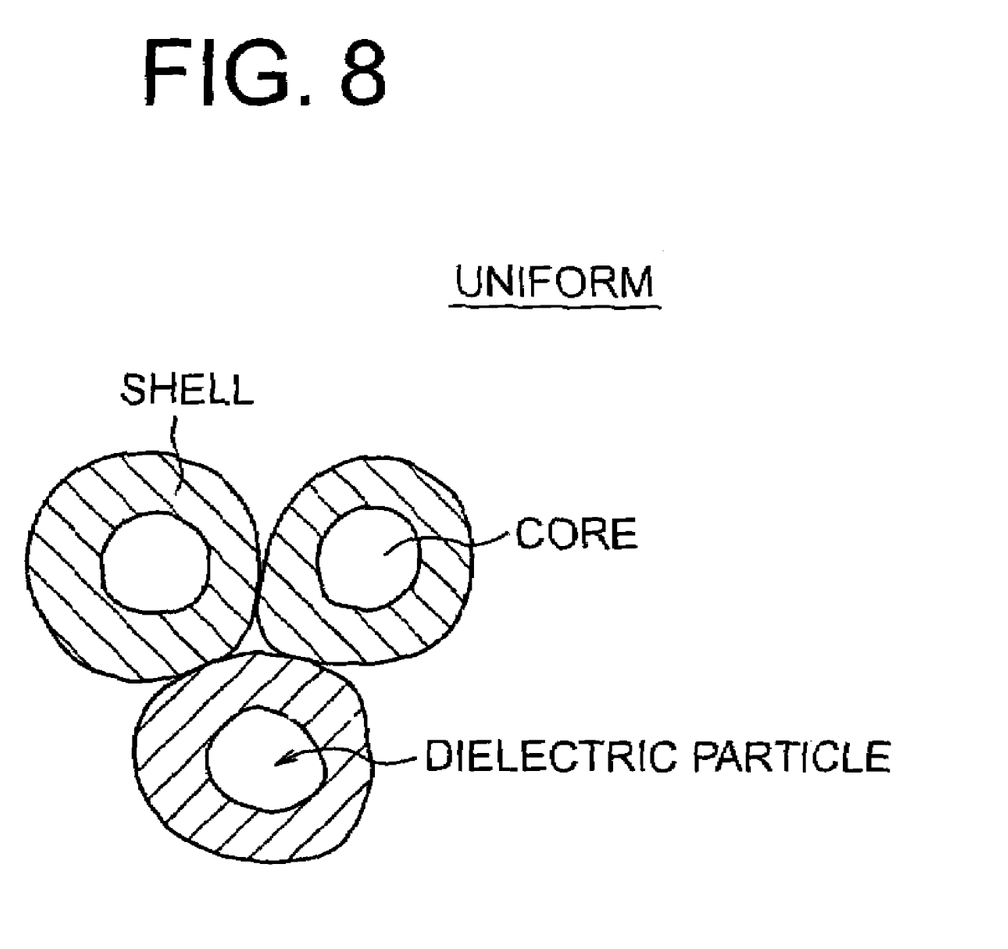
FIG. 8 is a schematic view of the TEM picture in FIG. 5.

FIG. 3 to FIG. 5 show pictures of the fine structure of the crystal grains having the above explained average grain diameter of 0.32 μm observed with a transmission electron microscope (TEM) and FIG. 6 to FIG. 8 show schematic views thereof.

In FIGS. 3 and 6 and FIGS. 5 and 8, the dielectric particles (crystal grains) are confirmed to have the core-shell structure that a shell (a subcomponent dispersion layer), wherein subcomponents are dispersed in barium titanate, is provided around a core substantially composed of barium titanate as the main component in both cases, however, the shell thickness is uneven in FIGS. 3 and 6 whereas the shell thickness is uniform in FIGS. 5 and 8. On the other hand, in FIGS. 4 and 7, it is confirmed that a part of the shells is missing and the cores are partially open.

Then, the maximum thickness t1 and the minimum thickness t2 of the shells 24a are calculated and the difference (t1−t2) was obtained, then, a ratio thereof to a radius R (half the average particle diameter) of the dielectric particles having the above average particle diameter was calculated (indicated as "difference in dispersed region" in Table). The result is shown in Table 1.

Figure 9:
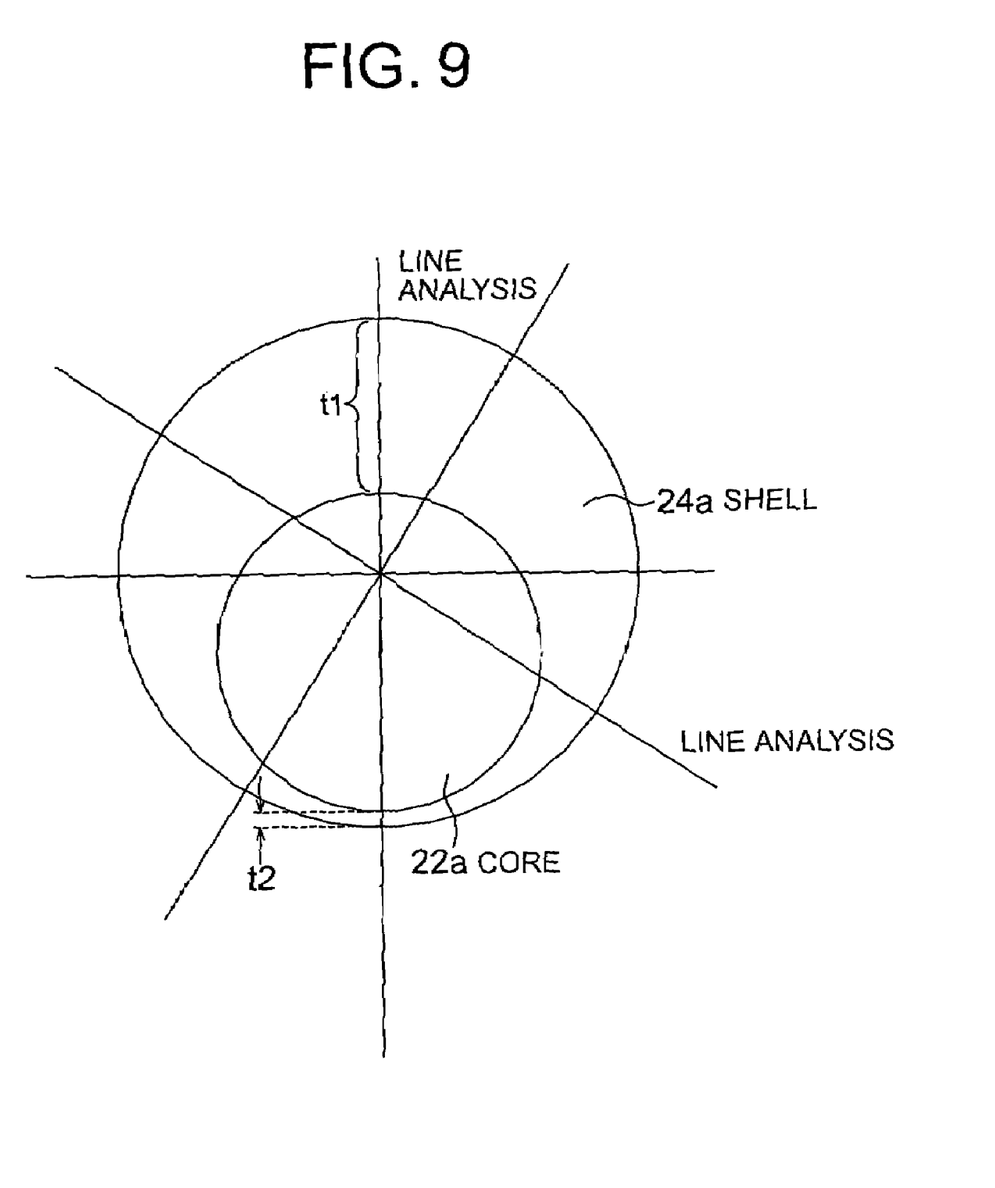
FIG. 9 is a schematic view for explaining a calculation method of a difference of a maximum thickness t1 and a minimum thickness t2 (t1−t2) of a shell in an example.

Note that, in the present embodiment, the difference of the maximum thickness t1 and the minimum thickness t2 (t1−t2) of the shells 24a was calculated as below. As shown in FIG. 9, a crystal grain having the average grain diameter was subjected to a line analysis with a TEM on a straight line passing the length of the grain through the approximate center thereof, then, another line analysis was made on the same grain by shifting the line by 45 degrees, a difference in the dispersed region was obtained, and the maximum value of the difference was considered as a difference in the dispersed region of the grain diameter. The analysis was made on n=10 grains and the average value was calculated (refer to FIG. 9).

characteristics (−55 to 150° C. and ΔC/C=within ±15%) were satisfied or not were examined. Those with −15% or higher were determined preferable.

The TC bias was measured on the obtained samples by a digital LCR meter (4274A made by YHP) at 1 kHz, 1 Vrms and a bias voltage (direct current voltage) of 7.0 V/μm by changing the temperature from −55° C. to 150° C. and evaluated by calculating a change rate of the capacitance from the measurement value at the time of not applying a bias voltage at 25° C. Note that an LCR meter was used for measuring the capacitance, and the measurement was made under a condition of a frequency of 1 kHz and an input signal level of 1 Vrms. The evaluation criterion was that −40% or higher was determined preferable.

TABLE 1

| Sample No. | First Preliminary Firing (Forming Thin Shell) | | | Second Preliminary Firing (Forming Uneven Shell Thickness) | | | Dielectric Particle | | Capacitor Sample | | | |
|---|---|---|---|---|---|---|---|---|---|---|---|---|
| | Preliminary Firing Temperature (° C.) | Preliminary Firing Time (h) | **Ratio (%) of Subcomponent Amount | Preliminary Firing Temperature (° C.) | Preliminary Firing Time (h) | **Ratio (%) of Subcomponent Amount | *Difference in Dispersed Region (%) | Shell Thickness | Temperature Change Rate (%) at 150° C. | X8R | TC Bias (%) | Permittivity |
| 1 | 700 | 0.2 | 30 | 400 | 1 | 70 | 90 | Uneven | −17.6 | X | −42.1 | 1404 |
| 2 | 700 | 3 | 30 | 450 | 3 | 70 | 60 | Uneven | −14.2 | ⊚ | −37.5 | 1402 |
| 3 | 700 | 3 | 30 | 470 | 3 | 70 | 40 | Uneven | −7.5 | ⊚ | −35.4 | 1400 |
| 4 | 700 | 3 | 30 | 500 | 3 | 70 | 20 | Uneven | −6.4 | ⊚ | −35.2 | 1391 |
| 5 | 700 | 3 | 30 | 520 | 3 | 70 | 10 | Uneven | −10.2 | ⊚ | −32.1 | 1380 |
| 6 | 700 | 3 | 30 | 550 | 3 | 70 | 6 | Uneven | −11.5 | ⊚ | −31.2 | 1371 |
| 7 | 700 | 3 | 30 | 600 | 3 | 70 | 2 | Uneven | −12.5 | ⊚ | −31.0 | 1160 |
| 8 | 700 | 3 | 50 | 900 | 3 | 50 | 0 | Uniform | −14.3 | ⊚ | −30.0 | 1100 |
| 9 | — | — | — | 1000 | 1 | 100 | Exposed | — | −26.5 | X | −65.0 | 1410 |

The "*Difference in Dispersed Region" indicates a ratio of a difference (t1 − t2) between the maximum thickness t1 and the minimum thickness t2 of a shell 24a of the dielectric particles 2a to a radius R (half an average particle diameter) of dielectric particles 2a having the average particle diameter.
The "**Ratio of Subcomponent Amount" indicates a ratio of each subcomponent amount to 100% of the finally added amount.

Production of Capacitor Sample

After polishing an end surface. of the obtained chip sintered body by sand blast, In—Ga was applied as external electrodes and the multilayer ceramic capacitor shown in FIG. 1 was obtained.

Evaluation of Characteristics of Capacitor Samples

Evaluation was made on a relative permittivity ε, temperature characteristic (TC) of the capacitance, TC bias and reliability of thus obtained capacitor samples, respectively. The results are shown in Table 1.

The relative permittivity ε (no unit) was calculated from a capacitance of the obtained capacitor sample measured at a reference temperature of 25° C. with a digital LCR meter (4274A made by YHP) under a condition of a frequency of 1 kHz and an input signal level (measurement voltage) of 1.0 Vrms. Those exhibited 1300 or higher were determined good in the evaluation criteria.

The capacity-temperature characteristic (Tc) was obtained by measuring a capacitance of the obtained samples in a temperature range of −55 to 150° C. A digital LCR meter (4274A made by YHP) was used for measuring the capacitance, and the measurement was made under a condition of a frequency of 1 kHz and an input signal level of 1 Vrms. Then, a capacitance change rate (ΔC/C, the unit is %) was calculated under a temperature environment at 150° C., at which the capacity-temperature characteristic becomes worst in the temperature range, and whether the X8R As shown in Table 1, when the difference in the dispersion region exceeds 60%, the permittivity is sufficient but the temperature characteristic does not satisfy the X8R, moreover, the TC bias deteriorates. When the difference in the dispersed region is 6% or smaller, the permittivity is sufficient and the temperature characteristic satisfies the X8R, but the relative permittivity ε becomes 1300 or smaller and it is hard to attain a multilayer of thin layers.

On the other hand, it was confirmed that when the difference in the dispersed region was in the range of the present invention (6 to 60%), the permittivity was high, the temperature characteristic satisfied the X8R and, moreover, the TC bias characteristic became excellent.

Incidentally, the sample described "exposed" in Table 1 was formed by adding all subcomponent materials at the second preliminary firing of the barium titanate material without performing the first preliminary firing, and the temperature characteristic and TC bias are confirmed to be deteriorated.

Example 2

Other than changing the amounts (adding quantities) of the subcomponent materials to be added at the first preliminary firing to 10%, 20% and 40% of their final adding quantities, respectively, capacitor samples were produced in the same way as that in the sample 4 of the example 1 and the same evaluation as that in the example 1 was made. The results are shown in Table 2.

TABLE 2

| Sample No. | First Preliminary Firing (Forming Thin Shell) | | | Second Preliminary Firing (Forming Uneven Shell Thickness) | | | Dielectric Particle | | Capacitor Sample | | | |
|---|---|---|---|---|---|---|---|---|---|---|---|---|
| | Preliminary Firing Temperature (° C.) | Preliminary Firing Time (h) | **Ratio (%) of Subcomponent Amount | Preliminary Firing Temperature (° C.) | Preliminary Firing Time (h) | **Ratio (%) of Subcomponent Amount | *Difference in Dispersed Region (%) | Shell Thickness | Temperature Change Rate (%) at 150° C. | X8R | TC Bias (%) | Permittivity |
| 10 | 700 | 3 | 10 | 500 | 3 | 90 | 25 | Uneven | −7.2 | ◎ | −35.2 | 1391 |
| 11 | 700 | 3 | 20 | 500 | 3 | 80 | 15 | Uneven | −8.1 | ◎ | −33.6 | 1370 |
| 4 | 700 | 3 | 30 | 500 | 3 | 70 | 20 | Uneven | −6.4 | ◎ | −35.2 | 1391 |
| 12 | 700 | 3 | 40 | 500 | 3 | 60 | 8 | Uneven | −12.3 | ◎ | −32.1 | 1320 |

The "*Difference in Dispersed Region" indicates a ratio of a difference (t1 − t2) between the maximum thickness t1 and the minimum thickness t2 of a shell 24a of the dielectric particles 2a to a radius R (half an average particle diameter) of dielectric particles 2a having the average particle diameter.
The "**Ratio of Subcomponent Amount" indicates a ratio of each subcomponent amount to 100% of the finally added amount.

As shown in Table 2, it was confirmed that the difference in dispersed region was in the range of the present invention (6 to 60%) in all samples and the same results could be obtained.

Example 3

Other than changing the holding temperature at the first preliminary firing to 400° C., 600° C. and 800° C., capacitor samples were produced in the same way as that in the sample 4 of the example 1 and the same evaluation as that in the example 1 was made. The results are shown in Table 3.

Example 4

Other than changing the firing time to 0.5 hour, 1 hour, 3.5 hours, 4 hours and 5 hours, capacitor samples were produced in the same way as that in the sample 4 of the example 1 and

TABLE 3

| Sample No. | First Preliminary Firing (Forming Thin Shell) | | | Second Preliminary Firing (Forming Uneven Shell Thickness) | | | Dielectric Particle | | Capacitor Sample | | | |
|---|---|---|---|---|---|---|---|---|---|---|---|---|
| | Preliminary Firing Temperature (° C.) | Preliminary Firing Time (h) | **Ratio (%) of Subcomponent Amount | Preliminary Firing Temperature (° C.) | Preliminary Firing Time (h) | **Ratio (%) of Subcomponent Amount | *Difference in Dispersed Region (%) | Shell Thickness | Temperature Change Rate (%) at 150° C. | X8R | TC Bias (%) | Permittivity |
| 13 | 400 | 3 | 30 | 500 | 3 | 70 | 37 | Uneven | −7.8 | ◎ | −35.9 | 1399 |
| 14 | 600 | 3 | 30 | 500 | 3 | 70 | 25 | Uneven | −7.0 | ◎ | −35.0 | 1350 |
| 4 | 700 | 3 | 30 | 500 | 3 | 70 | 20 | Uneven | −6.4 | ◎ | −35.2 | 1391 |
| 15 | 800 | 3 | 30 | 500 | 3 | 70 | 10 | Uneven | −9.9 | ◎ | −32.0 | 1340 |

The "*Difference in Dispersed Region" indicates a ratio of a difference (t1 − t2) between the maximum thickness t1 and the minimum thickness t2 of a shell 24a of the dielectric particles 2a to a radius R (half an average particle diameter) of dielectric particles 2a having the average particle diameter.
The "**Ratio of Subcomponent Amount" indicates a ratio of each subcomponent amount to 100% of the finally added amount.

As shown in Table 3, it was confirmed that the difference in dispersed region was in the range of the present invention the same evaluation as that in the example 1 was made. The results are shown in Table 4.

TABLE 4

| Sample No. | First Preliminary Firing (Forming Thin Shell) | | | Second Preliminary Firing (Forming Uneven Shell Thickness) | | | Firing Time (h) | Dielectric Particle | | Capacitor Sample | | | |
|---|---|---|---|---|---|---|---|---|---|---|---|---|---|
| | Preliminary Firing Temperature (° C.) | Preliminary Firing Time (h) | **Ratio (%) of Subcomponent Amount | Preliminary Firing Temperature (° C.) | Preliminary Firing Time (h) | **Ratio (%) of Subcomponent Amount | | *Difference in Dispersed Region (%) | Shell Thickness | Temperature Change Rate (%) at 150° C. | X8R | TC Bias (%) | Permittivity |
| 16 | 700 | 3 | 30 | 500 | 3 | 70 | 0.5 | 45 | Uneven | −10.4 | ◎ | −37.7 | 1430 |
| 17 | 700 | 3 | 30 | 500 | 3 | 70 | 1 | 35 | Uneven | −7.8 | ◎ | −36.0 | 1400 |
| 4 | 700 | 3 | 30 | 500 | 3 | 70 | 2 | 20 | Uneven | −6.4 | ◎ | −35.2 | 1391 |
| 18 | 700 | 3 | 30 | 500 | 3 | 70 | 3.5 | 15 | Uneven | −8.9 | ◎ | −33.6 | 1370 |

TABLE 4-continued

| | First Preliminary Firing (Forming Thin Shell) | | | Second Preliminary Firing (Forming Uneven Shell Thickness) | | | | Dielectric Particle | | Capacitor Sample | | | |
|---|---|---|---|---|---|---|---|---|---|---|---|---|---|
| Sample No. | Preliminary Firing Temperature (° C.) | Preliminary Firing Time (h) | **Ratio (%) of Subcomponent Amount | Preliminary Firing Temperature (° C.) | Preliminary Firing Time (h) | **Ratio (%) of Subcomponent Amount | Firing Time (h) | *Difference in Dispersed Region (%) | Shell Thickness | Temperature Change Rate (%) at 150° C. | X8R | TC Bias (%) | Permittivity |
| 19 | 700 | 3 | 30 | 500 | 3 | 70 | 4 | 7.5 | Uneven | −11.0 | ◎ | −32.4 | 1300 |
| 20 | 700 | 3 | 30 | 500 | 3 | 70 | 5 | 3 | Uneven | −14.6 | ◎ | −30.4 | 1145 |

The "*Difference in Dispersed Region" indicates a ratio of a difference (t1 − t2) between the maximum thickness t1 and the minimum thickness t2 of a shell 24a of the dielectric particles 2a to a radius R (half an average particle diameter) of dielectric particles 2a having the average particle diameter. The "**Ratio of Subcomponent Amount" indicates a ratio of each subcomponent amount to 100% of the finally added amount.

As shown in Table 4, it was confirmed that the longer the firing time became, the larger the difference in dispersed region tended to become. It was confirmed that when the firing time exceeds 4 hours, the difference in dispersed region becomes 6% or smaller to reduce the permittivity, while when 4 hours or shorter, the difference falls in the range of the present invention (6 to 60%).

What is claimed is:

1. A dielectric ceramic composition comprising a plurality of dielectric particles each having a shell, wherein subcomponents are dispersed in a main component, formed around a core substantially composed of the main component, wherein a difference of a maximum thickness t1 and a minimum thickness t2 (t1−t2) of said shell in a dielectric particle having an average particle diameter is controlled to be 10 to 40% of a radius R of said dielectric particle.

2. The dielectric ceramic composition as set forth in claim 1, wherein said main component includes barium titanate and said subcomponents include an oxide of Mg, an oxide of rare-earth element and an oxide of an alkaline earth element, wherein Mg is excluded.

3. The dielectric ceramic composition as set forth in claim 1, wherein:

said main component includes barium titanate; and
said subcomponents includes
at least one kind selected from MgO, CaO, BaO and SrO as a first subcomponent,
a silicon oxide as a second subcomponent,
at least one kind selected from $V_2O_5$, $MoO_3$ and $WO_3$ as a third subcomponent,
an oxide of R1, wherein is at least one kind selected from Sc, Er, Tm, Yb and Lu, as a fourth subcomponent,
$CaZrO_3$ or $CaO+ZrO_2$ as a fifth subcomponent,
an oxide of R2 wherein R2 is at least one kind selected from Y, Dy, Ho, Tb, Gd and Eu, as a sixth subcomponent, and
MnO as a seventh subcomponent;
and ratios of the respective subcomponents with respect to 100 moles of said main component are
the first subcomponent: 0.1 to 3 moles,
the second subcomponent: 2 to 10 moles,
the third subcomponent: 0.01 to 0.5 mole,
the fourth subcomponent: 0.5 to 7 moles, wherein the number of moles of the fourth subcomponent is a ratio of R1 alone,
the fifth subcomponent: 0<fifth subcomponent≦5 moles,
the sixth subcomponent: 9 moles or less, wherein the number of moles of the sixth subcomponent is a ratio of R2 alone, and
the seventh subcomponent: 0.5 mole or less.

4. The dielectric ceramic composition as set forth in claim 1, wherein:

said main component includes barium titanate; and
said subcomponents includes
an oxide of AE, wherein AE is at least one kind selected from Mg, Ca, Ba and Sr, as a first subcomponent,
an oxide of R, wherein R is at least one kind selected from Y, Dy, Tm, Ho and Er, as a second subcomponent,
$M_xSiO_3$, wherein M is at least one kind selected from Ba, Ca, Sr, Li and B; and x=1 when M=Ba, x=1 when M=Ca, X=1 when M=Sr, x=2 when M=Li and x=⅔ when M=B, as a third subcomponent,
MnO as a fourth subcomponent,
at least one kind selected from $V_2O_5$, $MoO_3$ and $WO_3$ as a fifth subcomponent, and
$CaZrO_3$ or $CaO+ZrO_2$ as a sixth subcomponent;
and ratios of the respective subcomponents with respect to 100 moles of said main component are
the first subcomponent: 0 to 0.1 mole, wherein 0 mole and 0.1 mole are excluded,
the second subcomponent: 1 to 7 moles, wherein 1 mole and 7 moles are excluded,
the third subcomponent: 2 to 10 moles,
the fourth subcomponent: 0 to 0.5 mole, wherein 0 mole is excluded,
the fifth subcomponent: 0.01 to 0.5 mole, and
the sixth subcomponent: 0 to 5 moles, wherein 0 mole and 5 moles are excluded.

5. An electronic device comprising a dielectric layer composed of a dielectric ceramic composition, wherein:

said dielectric ceramic composition is composed of the dielectric ceramic set forth in claim 1.

6. A multilayer ceramic capacitor comprising a capacitor element body, wherein dielectric layers composed of a dielectric ceramic composition and internal electrode layers are alternately stacked, wherein:

said dielectric ceramic composition is composed of the dielectric ceramic composition as set forth in claim 1.

7. An electronic device comprising a dielectric layer composed of a dielectric ceramic composition, wherein:

said dielectric ceramic composition is composed of the dielectric ceramic composition as set forth in claim 2.

8. An electronic device comprising a dielectric layer composed of a dielectric ceramic composition, wherein:

said dielectric ceramic composition is composed of the dielectric ceramic composition as set forth in claim 3.

9. An electronic device comprising a dielectric layer composed of a dielectric ceramic composition, wherein:
said dielectric ceramic composition is composed of the dielectric ceramic composition as set forth in claim 4.

10. A multilayer ceramic capacitor comprising a capacitor element body, wherein dielectric layers composed of a dielectric ceramic composition and internal electrode layers are alternately stacked, wherein:
said dielectric ceramic composition is composed of the dielectric ceramic composition as set forth in claim 2.

11. A multilayer ceramic capacitor comprising a capacitor element body, wherein dielectric layers composed of a dielectric ceramic composition and internal electrode layers are alternately stacked, wherein:
said dielectric ceramic composition is composed of the dielectric ceramic composition as set forth in claim 3.

12. A multilayer ceramic capacitor comprising a capacitor element body, wherein dielectric layers composed of a dielectric ceramic composition and internal electrode layers are alternately stacked, wherein:
said dielectric ceramic composition is composed of the dielectric ceramic composition as set forth in claim 4.

* * * * *